US008776060B2

(12) United States Patent
Jess et al.

(10) Patent No.: US 8,776,060 B2
(45) Date of Patent: Jul. 8, 2014

(54) METHODS AND STRUCTURE FOR NEAR-LIVE REPROGRAMMING OF FIRMWARE IN STORAGE SYSTEMS USING A HYPERVISOR

(75) Inventors: Martin Jess, Erie, CO (US); Charles E. Nichols, Wichita, KS (US); Rexford A. Hill, San Diego, CA (US); John G. Logan, Long Beach, CA (US); Timothy R. Snider, Derby, KS (US)

(73) Assignee: LSI Corporation, Milpitas, CA (US)

( * ) Notice: Subject to any disclaimer, the term of this patent is extended or adjusted under 35 U.S.C. 154(b) by 553 days.

(21) Appl. No.: 12/939,548

(22) Filed: Nov. 4, 2010

(65) Prior Publication Data

US 2012/0117562 A1      May 10, 2012

(51) Int. Cl.
G06F 9/46         (2006.01)
G06F 9/455       (2006.01)
G06F 9/445       (2006.01)

(52) U.S. Cl.
CPC .............. G06F 8/67 (2013.01); G06F 9/45558 (2013.01)
USPC ....................................................... 718/100

(58) Field of Classification Search
CPC ................................ G06F 8/67; G06F 9/45558
USPC .................................................... 718/1, 100
See application file for complete search history.

(56) References Cited

U.S. PATENT DOCUMENTS

| | | | |
|---|---|---|---|
| 6,795,966 B1 * | 9/2004 | Lim et al. ........................... | 718/1 |
| 6,934,755 B1 * | 8/2005 | Saulpaugh et al. ........... | 709/226 |
| 2002/0120789 A1 | 8/2002 | Franklin | |
| 2006/0236094 A1 | 10/2006 | Leung | |
| 2008/0040458 A1 | 2/2008 | Zimmer | |
| 2009/0007105 A1 * | 1/2009 | Fries et al. ........................ | 718/1 |
| 2009/0037554 A1 * | 2/2009 | Herington ..................... | 709/213 |
| 2009/0125904 A1 * | 5/2009 | Nelson ............................... | 718/1 |
| 2010/0037296 A1 | 2/2010 | Silverstone | |
| 2010/0306773 A1 | 12/2010 | Lee | |
| 2011/0022695 A1 * | 1/2011 | Dalal et al. .................... | 709/222 |
| 2011/0023114 A1 * | 1/2011 | Diab et al. ....................... | 726/22 |
| 2011/0078682 A1 | 3/2011 | Doan | |
| 2011/0265076 A1 * | 10/2011 | Thorat et al. .................... | 717/172 |
| 2012/0102135 A1 * | 4/2012 | Srinivasan et al. ............ | 709/213 |

* cited by examiner

*Primary Examiner* — Emerson Puente
*Assistant Examiner* — Charlie Sun
(74) *Attorney, Agent, or Firm* — Duft Bornsen & Fettig

(57) ABSTRACT

Methods and structure for reprogramming firmware in a storage controller using a virtual machine management (VMM) environment. A storage process (current firmware) in the storage controller operates in a current virtual machine (VM) under control of a hypervisor. Reprogrammed (new) firmware is loaded into a new virtual machine under control of the hypervisor. The new firmware initializes and directs the current firmware to quiesce its processing. The new firmware also requests the hypervisor to map data in the memory space of the current virtual machine into the memory space of the new virtual machine and to transfer ownership/control of devices and network addresses from the current virtual machine to the new virtual machine. The new firmware operating on the new virtual machine then takes control of the storage controller and resumes processing of requests.

16 Claims, 6 Drawing Sheets

METHODS AND STRUCTURE FOR NEAR-LIVE REPROGRAMMING OF FIRMWARE IN STORAGE SYSTEMS USING A HYPERVISOR

RELATED PATENTS

This patent is related to commonly owned U.S. patent application Ser. No. 12/200,497, entitled METHODS AND SYSTEMS FOR INTEGRATED STORAGE AND DATA MANAGEMENT USING A HYPERVISOR, filed 28 Aug. 2005 which is hereby incorporated by reference.

BACKGROUND

1. Field of the Invention

The invention relates generally to storage systems and more specifically relates to methods and structure for providing near-live reprogramming of firmware for storage controllers operating in a virtual machine (i.e., hypervisor) environment.

2. Discussion of Related Art

Storage systems have evolved in many respects over decades. Modern storage systems provide not only redundancy (e.g., RAID storage management techniques) but also frequently incorporate higher level storage services. For example, many present day storage systems provide virtualization services within the storage system (above and beyond RAID storage management) to permit further hiding of the mapping from logical storage volumes to physical storage devices and locations. Still further, many present day storage systems provide services for automated backups, de-duplication, replication (e.g., "shadow copies"), etc.

As storage systems have evolved to provide more services, firmware (programmed instructions for execution by a processor and/or customized, reprogrammable logic circuits) has grown in complexity. It is common that the firmware in such sophisticated storage systems may require reprogramming from time to time. Such reprogrammed firmware may provide bug fixes and/or feature upgrades as compared to a current version of the firmware. In some circumstances, the firmware may be reprogrammed to return to an older version of firmware due to bugs or problems in a newer version. Typically, as presently practiced, such reprogramming of firmware requires that the storage system be taken "offline" for a period of time to perform the firmware reprogramming. While offline, host systems may be incapable of accessing the data on the storage devices of the storage system and incapable of adding new data to be stored in the storage system.

In some high reliability storage system environments it may be unacceptable to permit the storage system to be offline. Most such high reliability storage systems provide for redundant storage controllers to help assure continuous access to the stored data. The redundant controllers provide for a backup controller to assume control of processing host system requests in case of failure of the presently active controller. To further enhance reliability, the host systems may also provide for redundant communication paths to each of the multiple redundant storage controllers of the storage system. A backup communication path may be used if a primary communication path appears to have failed. In storage systems with such redundant architectures, the host systems typically incorporate some form of "multi-path" driver software so that each host can direct I/O requests over an appropriate path and re-direct an I/O request to another path in case of failure of a communication link or of a controller.

In a redundant controller environment, a firmware reprogramming process may be performed by cooperative processing between the controllers such that one of the controllers informs the other controller that it will be offline for a period of time and that the other controller should assume responsibility for processing host requests as the first controller's firmware is reprogrammed. After the first controller's firmware is successfully reprogrammed, it may inform the other controller that it should perform its firmware reprogramming while the first controller assumes responsibility for processing I/O requests. Eventually both controllers will be back online and the system will continue normal processing using the reprogrammed firmware. Such known reprogramming processes eliminate the offline status of the storage system but at the cost of reduced performance and/or reliability while one of the redundant controllers is "offline" during its firmware reprogramming process.

The above summarized prior approach relies on the host systems' multi-path driver software to make appropriate switches between the redundant communication paths and redundant controllers at appropriate times during the firmware replacement process. "Multi-path" driver software typically resides in host systems to keep the selection of a particular communication path to a particular storage controller of the storage system transparent to the host system applications. The multi-path driver receives application I/O requests from applications and routes the requests to a selected storage controller of the redundant controllers via a selected path of the redundant communication paths to the selected controller. This reliance on the multi-path driver to perform appropriate processing at the appropriate time during the firmware reprogramming can give rise to problems. Ideally, a first controller will be able to go through steps of transferring responsibility for its volumes, reprogramming its firmware, and reacquiring control of its volumes before the host systems' multi-path drivers times out. If this is the case, there is a relatively brief period of time while the host systems are retrying I/O requests to the first controller when suddenly the first controller will start processing requests and responding again—using the new firmware version. However, the time required for reboot of the first controller (following reprogramming of its firmware) may be significant in some storage systems because the controller needs to do a full discovery of the back-end storage device network (e.g., SAS discovery, etc.) including expansion trays, etc. This reboot processing of the controller can take so long that it triggers failover processing by the multi-path driver of the host system to utilize an alternate path between the host and the storage system. In a worst case scenario of this kind where the multi-path driver times out its preferred path while the first controller is in the process of reprogramming its firmware, the first controller and the multi-path driver may tear down all the data structures they had set up for the storage system via this apparently failed path. The host multi-path driver will then attempt to access the logical volumes on the storage system using the alternate path (e.g., the other controller). The multi-path driver will then try to re-create the data structures for the alternate path to the other controller. In some cases, it may take the multi-path driver a long time to tear down the data structures relating to the first controller. The time required could be long enough that when it finally attempts to access the logical volumes using the other controller, that other controller has already begun transferring the first controller's logical volumes back to control of the first controller. The multi-path driver may then time out again, this time because of incorrect use of the alternate path to the other controller. In such a case the whole storage system may considered failed by the host system although in fact it is just reprogramming the firmware. In some worst cases of the scenario described above where the timing conditions repeat, the storage system may have entered into a "deadly embrace" that will require an administrator to take explicit steps in order to get the storage system operational. An administrative user would then have to take explicit, manual recovery action in this case to get the overall system back up and running.

Thus, it is an ongoing challenge to efficiently reprogram firmware in a storage system where redundant paths and controllers may be used in conjunction with multi-path driver software on attached host systems.

SUMMARY

The present invention solves the above and other problems, thereby advancing the state of the useful arts, by providing methods and structure for reprogramming firmware in a storage controller using a virtual machine management (VMM) environment. A storage process (current firmware) in the storage controller operates in a current virtual machine (VM) under control of a hypervisor. Reprogrammed firmware is loaded into a new virtual machine under control of the hypervisor. The new firmware initializes and directs the current firmware to quiesce its processing. The new firmware also requests the hypervisor to map data in the memory space of the current virtual machine into the memory space of the new virtual machine and to transfer ownership/control of devices from the current virtual machine to the new virtual machine. The new firmware operating on the new virtual machine then takes control of the storage controller and resumes processing of requests. Thus, the down time wherein the storage system is unavailable to process requests is reduced.

In one aspect hereof, a method is provided for reprogramming firmware in a storage system comprising a plurality of virtual machines operating under control of a virtual machine manager (hypervisor). The method comprises operating current firmware on a current virtual machine of the plurality of virtual machines. The current firmware processes I/O requests directed to the current virtual machine. The method then starts a new virtual machine of the plurality of virtual machines. The new virtual machine is adapted to operate under control of new firmware. The method then quiesces operation of the current firmware and maps data from a memory space of the current virtual machine into memory space of the new virtual machine. The method then transfers control of devices presently controlled by the current virtual machine to control by the new virtual machine and commences operation of the new firmware in the new virtual machine to process I/O requests directed to the new virtual machine through the devices.

Another aspect hereof provides a method for reprogramming firmware in a storage system comprising a plurality of virtual machines operating under control of a virtual machine manager (hypervisor) and further comprising current firmware presently operating in a current virtual machine of the plurality of virtual machines and new firmware loaded in a new virtual machine of the plurality of virtual machines. The method comprises starting operation of the new virtual machine wherein the new firmware in the new virtual machine initializes its operation. The method then maps data from memory space of the current virtual machine into memory space of the new virtual machine and directs the current virtual machine to enter a stable state in which no further processing is performed by the current virtual machine to process I/O requests. The method then detects that the current virtual machine has entered the stable state. Responsive to detecting that the current virtual machine has entered the stable state, the method then transfers control of devices presently controlled by the current virtual machine to control by the new virtual machine; transfers control of network addresses presently owned by the current virtual machine to ownership by the new virtual machine; and commences operation of the new firmware in the new virtual machine to process I/O requests directed to the new virtual machine through the devices.

Yet another aspect hereof provides a storage system controller comprising a virtual machine manager (hypervisor) operable to create and manage a plurality of virtual machines on the storage controller, a current virtual machine operable under control of the hypervisor, and a new virtual machine operable under control of the hypervisor. Current firmware is operable on the current virtual machine to process received I/O requests and new firmware is loaded into the new virtual machine. The new firmware is also adapted to process I/O requests. The controller is adapted to quiesce operation of the current firmware and to map data in a memory space of the current virtual machine into a memory space of the new virtual machine. The controller is further adapted to transfer control of devices presently controlled by the current virtual machine to control by the new virtual machine is further adapted to operate the new firmware in the new virtual machine to process I/O requests directed to the new virtual machine through the devices.

DETAILED DESCRIPTION OF THE DRAWINGS

Figure 1:
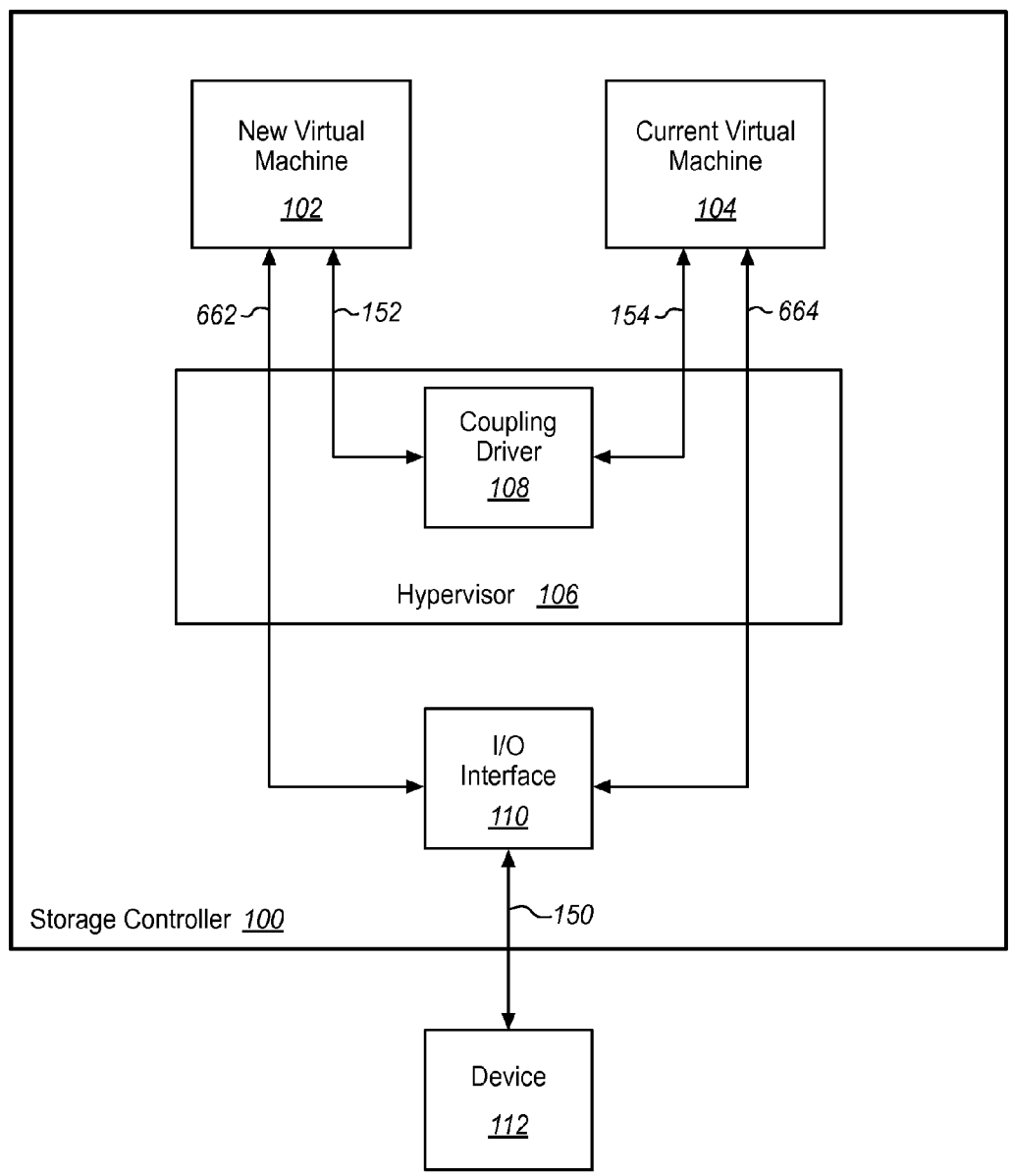
FIG. 1 is a block diagram of an exemplary storage controller adapted to improve the firmware reprogramming process in accordance with features and aspects hereof

FIG. 1 is a block diagram of an exemplary storage system controller 100 enhanced in accordance with features and aspects hereof to permit simplified reprogramming of firmware operable in the storage controller 100. As noted above, "firmware" as used herein refers to program instructions to be executed by a general or special purpose processor (not shown) and/or logic to be programmed into reprogrammable logic circuits (not shown) adapted to perform specific functions within storage controller 100.

Using virtual machine management (VMM) techniques, multiple computing systems (i.e., multiple operating systems and associated applications) can be consolidated into a single physical computing platform. A hypervisor (e.g., hypervisor 106) provides the ability to run multiple virtual machines (VMs) on the same physical computing platform, each VM with it own operating system (OS). The VMs are managed by the hypervisor that operationally resides between the VMs and the actual physical components of the computing platform. VMs can communicate with one another using an inter- VM communication mechanism (e.g., "coupling driver" 108). "Coupling driver" 108 may be provided in any of several manners by services of hypervisor 106. In general, a hypervisor provides primitive mechanisms for inter-VM communication. The hypervisor may extend this mechanism to provide emulated network devices and an emulated network to which the devices are attached (as in the case of the virtual IP connectivity that the hypervisor provides to VMs), or VMs themselves may implement drivers (these are typically referred to as "coupling drivers") that access the primitive mechanisms and adapt them to a driver framework (such as a SCSI framework) within the VM's operating system. Device drivers in VMM environments can be running in the hypervisor per se or in some "privileged" VM. However, some hypervisor environments also support direct assignment of physical devices to non-privileged VMs. Thus, as used herein, "coupling driver" 108 represents any suitable inter-VM communication capabilities provided by the underlying virtual machine management architecture (e.g., provided by services of a hypervisor).

One exemplary virtual machine platform known as Xen provides such capabilities. Those of ordinary skill in the art are knowledgeable of the Xen platform. Background and technical detail information relating to the Xen virtual machine environment may be found at www.xen.org. For example, PCI devices in the Xen hypervisor may be assigned to a non-privileged VM. In such an environment, one VM in a storage controller may be running virtualization services accessing logical volumes managed by a RAID application operating in another VM. The virtualization services VM may communicate with the RAID VM through a coupling driver. Further, in such an exemplary environment, a host-side I/O interface (and associated driver software) may be assigned to the virtualization services VM and a storage devices I/O interface (and its associated driver software is assigned to the RAID VM. The virtualization services will receive I/O requests from host systems via the host-side I/O interface and map those requests into lower level requests submitted to the RAID VM over the coupling driver in the hypervisor. The RAID VM will access the storage devices (typically external to this hypervisor platform) via the storage devices I/O interface in order to service the RAID logical volume requests it receives via the coupling driver. Some hypervisor environments, such as Xen, also provide a mechanism whereby memory pages assigned to one VM can be mapped to another VM so that both VMs can access the memory pages.

In accordance with features and aspects hereof, storage controller 100 is operable under control of a virtual machine manager—i.e., hypervisor 106. Hypervisor 106 is adapted to present a plurality of virtual machines operable within storage controller 100. Access to the physical elements of storage controller 100 are controlled and managed through hypervisor 106. Under control of hypervisor 106, current virtual machine 104 is operable to perform storage related processing in storage controller 100. The storage processes operable in current virtual machine 104 may provide lower-level storage management features such as RAID storage management or other may provide higher-level storage applications such as storage virtualization, de-duplication, replication, localized backup, etc. Still further, multiple virtual machines may operate under control of hypervisor 106 to provide a variety of storage management features. For example, one current virtual machine may provide higher-level virtualization services while another current virtual machine may provide lower-level RAID storage management features. Any such current virtual machine storage process may require reprogramming of its programmed logic to fix bugs and/or to provide new features and enhancements. Thus, in accordance with features and aspects hereof, a new virtual machine 102 may be created under control of hypervisor 106 and may be loaded with the reprogrammed firmware to replace the corresponding current firmware operating in current virtual machine 104.

As required to complete the reprogramming of firmware, new virtual machine 102 and current virtual machine 104 may communicate under control of hypervisor 106 through coupling driver 108. In particular, current virtual machine 104 may be coupled with coupling driver 108 via communication path 154 and new virtual machine 102 may be coupled with coupling driver 108 via communication path 152. Communication paths 152 and 154 may utilize any suitable communication medium and protocol provided by hypervisor 106 for exchanging information through coupling driver 108. In general, as is well known in the art, coupling driver 108 appears to each of the plurality of virtual machines (102 and 104) as a device driver used to read or write information from or to another virtual machine.

Each of the plurality of virtual machines (102 and 104) may be coupled with one or more I/O interfaces 110 in accordance with supported features of hypervisor 106. Through I/O interface 110, any virtual machine may communicate with a corresponding device 112 via communication path 150. I/O interface 110 may be any suitable circuits and/or logic adapted to allow a virtual machine to communicate with external device 112. In one exemplary embodiment where the virtual machine is providing lower-level RAID storage management, I/O interface 110 may permit the virtual machines to communicate with storage devices 112 such as disk storage devices managed in accordance with RAID storage management techniques. Other I/O interfaces 110 may permit a virtual machine to communicate with host system device 112 to receive I/O requests. In other exemplary embodiments where the virtual machine is providing higher-level storage applications, the virtual machine may communicate through an I/O interface 110 with an attached host system device 112. Those of ordinary skill in the art will readily recognize numerous other configurations of storage controller 100 in which one or more virtual machines are operable and may require reprogramming of their respective firmware.

In operation, current virtual machine 104 processes requests received from attached host systems (not shown) or from other virtual machines within storage controller 100. When a firmware reprogramming is required, the new firmware is loaded into a newly created virtual machine 102 under control of hypervisor 106. The new firmware is then initialized to such a point that the new virtual machine storage process 102 may direct the reprogramming to assume control from the current virtual machine 104. In particular, new virtual machine 102 communicates with current virtual machine 104 through coupling driver 108 and paths 152 and 154 to direct current virtual machine 104 to switch to a stable state in which further request processing is quiesced. In such a stable state, current virtual machine 104 stops processing new requests and may flush any data stored in its cache memory to any appropriate devices 112. Quiescing at current virtual machine 104 may also comprise processing to quiesce hardware components such as I/O interfaces accessed by the VM. The particular functions to be quiesced will depend upon the particular functions provided by the current virtual machine 104. Current virtual machine 104 eventually signals new virtual machine 102 that it has entered the desired stable state by sending an appropriate message through coupling driver 104 108 via paths 154 and 152. Responsive to sensing that the current virtual machine 104 has entered a stable state, new virtual machine 102 may request that hypervisor 106 map memory presently utilized by current virtual machine 104 to make the data therein accessible by virtual machine 102. As is well known to those of ordinary skill in the art, hypervisor 106 maintains virtual memory mapping structures to permit each of the plurality of virtual machines to access corresponding portions of physical memory. By mapping physical memory presently used by current virtual machine 104 to be accessible by new virtual machine 102, new virtual machine 102 may acquire information relating to objects under control of the presently operating current virtual machine 102. The information mapped into the memory space of the new virtual machine may include, for example, information relating to logical volumes presently under control of current virtual machine 104 and/or information relating to the status of devices presently own or under control of current virtual machine 104. In addition, new virtual machine 102 may request that hypervisor 106 transfer ownership of any devices presently owned or under control of current virtual machine 104. The "devices" to be transferred may include any devices and/or I/O interfaces presently assigned to current virtual machine 104. For example, "devices" to be transferred may includes interfaces, memory components, user interface and console devices, locally attached storage devices, etc. Such devices will then be owned or controlled by new virtual machine 102 (e.g., re-assigned to new virtual machine 102). Responsive to acquiring ownership of the devices and interfaces, new virtual machine 102 may be further operable to synchronize its status information with the present status of all such newly assigned devices. Such synchronization may entail querying the various devices to determine their present status. Still further, new virtual machine 102 may request that hypervisor 106 transfer all network addresses presently utilized by current virtual machine 104 to be re-assigned to new virtual machine 102. Such network addresses may include network addresses utilized for communications with devices and/or host systems as well as network addresses utilized for management specific communications. This transfer of network addresses may comprise duplicating the MAC address of the current virtual machine and shutting down the corresponding network interface of the current VM 104 prior to starting the network interface of the new VM 102. The transfer of MAC addresses avoids MAC address conflict problems.

Having so accessed and updated all relevant status information, transferred control of devices and interfaces, and accessed relevant data in the memory from current virtual machine 104, new virtual machine 102 may then commence processing of requests received by storage controller 100. Current virtual machine 104 may then cease operations and relinquish any resources for reuse by hypervisor 106 (e.g., memory and other resources utilized by current virtual machine 104). Thus, firmware for operation of storage controller 100 is reprogrammed with little or no downtime in which stored data is inaccessible.

It will be readily recognized by those of ordinary skill in the art that the reprogrammed firmware will have been previously loaded into storage controller 100 for purposes of performing the above described reprogramming. In other words, the actual download processing to acquire and store the reprogrammed firmware is a precondition to the processing described above for actually switching to the reprogrammed firmware from the current firmware presently operating in current virtual machine 104. Further, those of ordinary skill in the art will readily recognize that error checking may be performed as an aspect of the reprogramming process to assure that the current firmware, operable in the current virtual machine, may be appropriately reprogrammed to the new firmware to be operable in the new virtual machine. Typically, such error checking may be performed by external administrative tools such that an incompatible reprogramming will not be attempted. Still further, where high reliability storage systems provide for redundant storage controllers, each of the redundant storage controllers will perform similar reprogramming so that the redundant controllers are operable with identical reprogrammed firmware. Coordination of the reprogramming between multiple such redundant controllers will be readily apparent to those of ordinary skill in the art. Further yet, the transfer of ownership or control of devices and interfaces from current virtual machine 104 to new virtual machine 102 may be performed by any suitable means compatible with hypervisor 106. For example, "hot plug" capabilities may be provided in some hypervisor software such that the transfer of ownership may be performed by simulating the "unplugging" of an I/O interface or device from current virtual machine 104 and simulating "plugging" the same I/O interface or device into new virtual machine 102. Such capabilities may be provided by a number of virtual machine management platforms including the Xen platform identified above.

Figure 6:
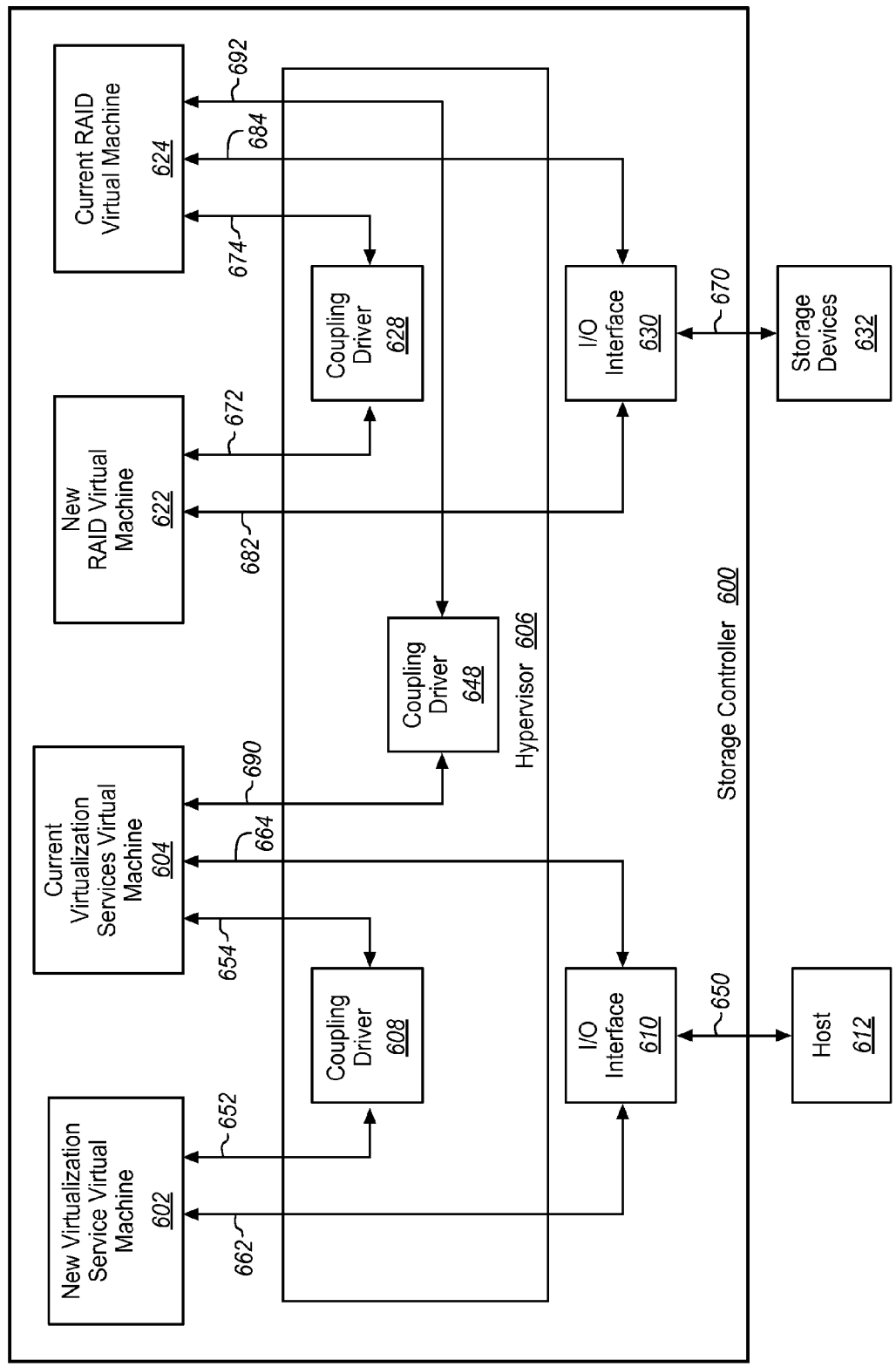
FIG. 6 is a block diagram of another exemplary storage controller adapted to improve the firmware reprogramming process in accordance with features and aspects hereof.

FIG. 6 is a block diagram of another exemplary storage controller 600 enhanced in accordance with features and aspects hereof for improved reprogramming of firmware. Controller 600 of FIG. 6 is similar to controller 100 of FIG. 1 but shows multiple virtual machines operable in the controller 600 under control of hypervisor 606. The multiple virtual machine operable in controller include a current RAID VM 624 operable to provide lower level RAID management of data stored on storage devices 632 (through interface 630 and paths 684 and 670). The multiple virtual machines in controller 600 further include a current virtualization services VM 604 operable to provide virtualization services for the storage controller 600 with respect to attached host systems 612 (through interface 610 and paths 664 and 650). These two current VMs (604 and 624) represent VMs operating using current firmware. These current VMs may communicate via coupling driver 648 (via paths 690 and 692) so that virtualization services in VM 604 may provide I/O requests to RAID VM 624. Reprogrammed firmware (i.e., new or upgraded firmware) may be loaded into new VMs 602 and 622 to serve as a replacement for the current firmware operating in VMs 604 and 624, respectively. As described above with respect to FIG. 1 the new virtual machines may each communicate with its corresponding current virtual machine via a corresponding coupling driver (i.e., new VM 602 communicates with current VM 604 via coupling driver 608 and paths 652 and 654 while new VM 622 communicates with current VM 624 via coupling driver 628 and paths 672 and 674). The communications between new and current VMs (and with hypervisor 606) permit the new VMs to acquire access to memory in the current VMs (i.e., by mapping the memory space of a new VM to access portions of data in the memory space of the corresponding current VM. The new VMs assume control of I/O interfaces presently controlled/owned by the corresponding current VMs (i.e., current VM 604 presently controls interface 610 via path 664 and new VM 602 assumes control of interface 610 and communicates with the interface via path 662 while current VM 624 presently controls interface 630 via path 684 and new VM 622 assumes control of interface 630 and communicates with the interface via path 682). Thus, controller 600 of FIG. 6 demonstrates that the VM reprogramming features hereof may be applicable to any number of VMs presently operating in a storage controller. Further, those of ordinary skill in the art will readily recognize that any number of VMs may be operable in a controller and that any portion of those VMs may be reprogrammed, in accordance with features and aspects hereof, to provide replacement firmware for continued operation of the storage controller.

Figure 2:
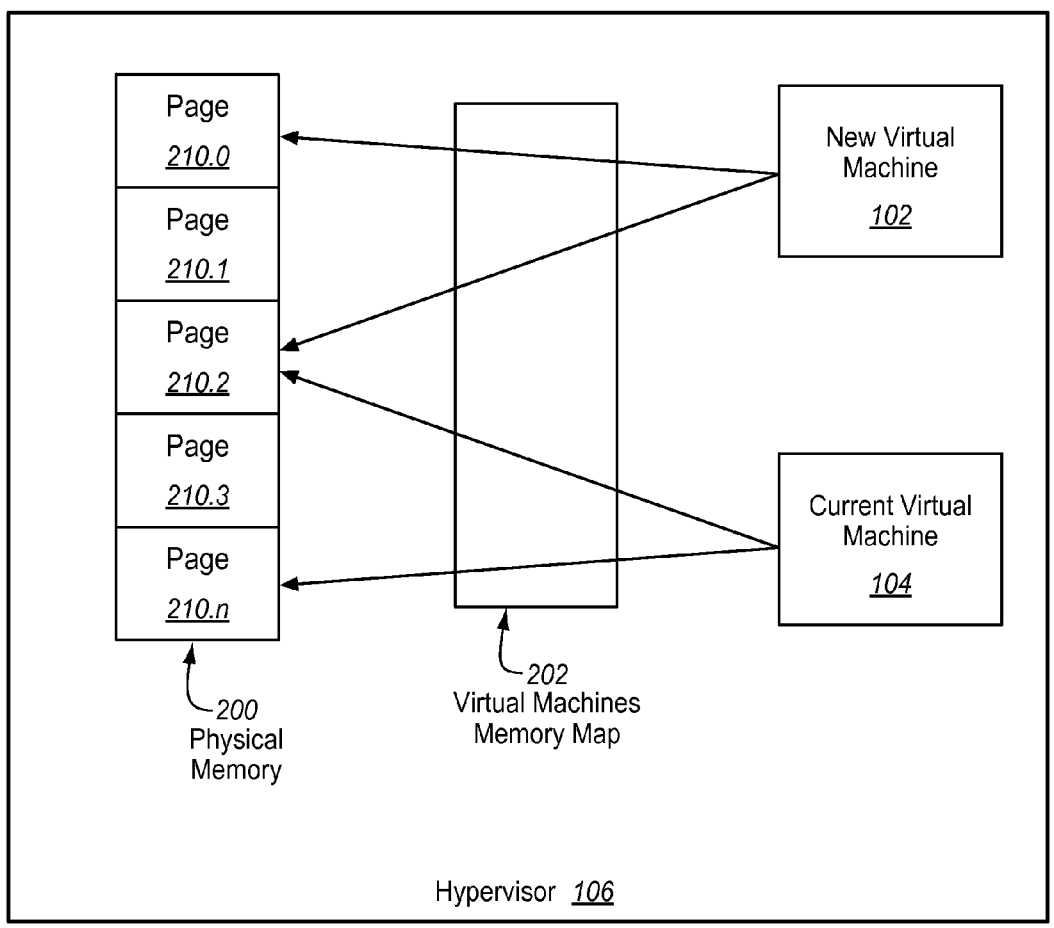
FIG. 2 is a block diagram providing exemplary additional of an aspect of the hypervisor of FIG. 1 for mapping data between the current and new virtual machines in accordance with features and aspects hereof

FIG. 2 is a block diagram providing exemplary additional details regarding the management of memory for multiple virtual machines operating under control of hypervisor 106. In general, hypervisor 106 maintains essentially complete control over physical memory 200 within the storage controller. Virtual machines memory map 202 is a data structure maintained by hypervisor 106 to provide for mapping of memory utilized by each virtual machine into corresponding pages or blocks of physical memory 200. By way of example, current virtual machine 104 may be accessing pages 210.2 and 210.n of physical memory 200 in accordance with logical addresses in the memory space of current virtual machine 104. These logical addresses are mapped by translation through virtual machines memory map 202 data structure provided and maintained by hypervisor 106 to identify the corresponding pages in physical memory 200. In like manner, new virtual machine 102 may access physical pages 210.0 and 210.2 utilizing corresponding mapping structures provided and maintained by hypervisor 106 as virtual machines memory map 202. As indicated in FIG. 2, page 210.2 is utilized by current virtual machine 104 and may store information useful to new virtual machine 102 as it assumes control of storage controller 100. Thus, new virtual machine 102 may request hypervisor 106 to map the physical page 210.2 into the memory space for new virtual machine 102. Virtual machine 102 may thereby access information generated and maintained by current virtual machine 104. By accessing data in physical page 210.2, new virtual machine 102 may perform portions of its initialization based on information relating to objects presently under control of current virtual machine 104. Such information may include, for example, information relating to logical volumes, information relating to virtualization services, and information relating to other higher level storage application services—all provided by current firmware operating in current virtual machine 104. Where the reprogrammed firmware (e.g., new firmware of the new virtual machine 102) uses different or incompatible data structures, a conversion process may be included in the processing of the new virtual machine 102 to convert information in the data structures of the current virtual machine 104 into corresponding information to be stored in data structures of the new virtual machine 102. Specific techniques utilized by virtual machines in communicating with hypervisor 106 to permit such shared access to memory will be unique to the particular virtual machine management software utilized and will be readily understood by those of ordinary skill in the art.

Those of ordinary skill in the art will readily recognize numerous additional and equivalent elements present in a fully functional storage controller 100 of FIGS. 1 and 2. Such additional and equivalent elements are omitted herein for simplicity and brevity of this discussion.

Figure 3:
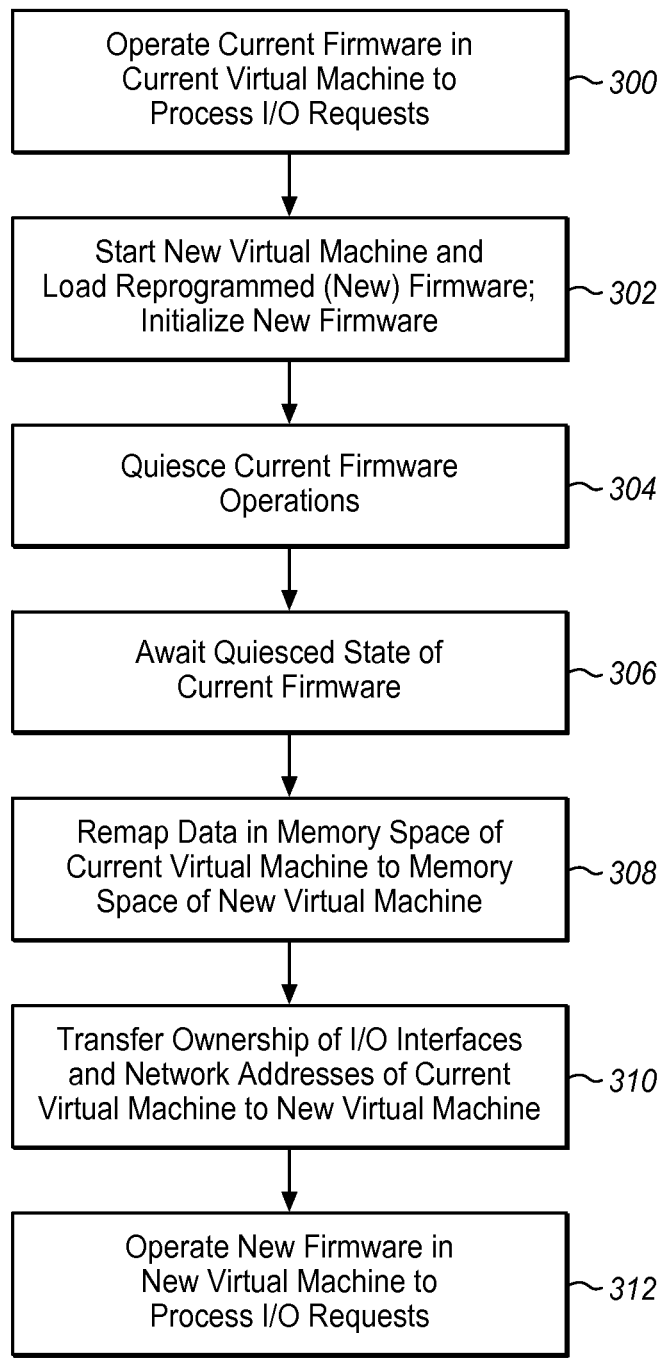
FIGS. 3 and 4 are flowcharts describing exemplary methods for improved firmware reprogramming of a storage controller in accordance with features and aspects hereof.

FIG. 3 is a flowchart describing an exemplary method for improved firmware reprogramming in a storage controller in accordance with features and aspects hereof. The method of FIG. 3 may be operable in an enhanced storage controller providing for virtual machine management (e.g., operable under control of a hypervisor) such as storage controller 100 of FIG. 1. At step 300, the current firmware is presently operating in the current virtual machine to process I/O requests received from an attached initiator. Depending on the particular storage services provided by the current firmware, an "initiator" may be a host system coupled with the storage system in which the storage controller is operating or may be another virtual machine operable within the storage controller generating requests to be performed by the current virtual machine. At step 302, a new virtual machine is created and started with the new (reprogrammed) firmware loaded into the virtual machine memory space and/or logic components. The new firmware may commence operation to initialize to whatever point initialization is appropriate before assuming control of operation of the storage controller from the current virtual machine.

At step 304, having completed preliminary initialization sequences, the current firmware quiesces its current operations at the request of the new firmware—i.e., completes processing of I/O requests presently being performed and enter a stable state wherein the new firmware may assume control. In step 306, the new firmware awaits a response from the current firmware indicating that it has achieved a stable, quiesced date. The new firmware at step 308 then requests, through the hypervisor, access to portions of data in the memory space of the current virtual machine. Responsive to the request, the hypervisor will map the memory space of the new virtual machine to enable access to data in identified portions of the memory space of the current virtual machine. The data to be used by the new virtual machine is then mapped in the virtual memory map for the new virtual machine by operation of the hypervisor to allow access to the identified portions of data presently in the memory space mapped to the current virtual machine. As noted above, information stored in the mapped data may include information regarding logical volumes managed by the current virtual machine and/or information relating to higher-level storage services provided by the current virtual machine. At step 310 ownership of I/O interfaces/device and network addresses currently utilized by the current virtual machine is transferred to the new virtual machine (again under control of the hypervisor).

Having transferred control of I/O interfaces/devices and network addresses, and having access to data previously mapped in the memory space of the current virtual machine, the new virtual machine may commence operation of the new firmware to process I/O requests at step 312. Thus, the new firmware operating in the new virtual machine has achieved the desired reprogramming of firmware operating the storage controller with little or no downtime impact in operation of the current firmware operating in the current virtual machine. Rather, the new and current virtual machines may be simultaneously operable and cooperating to exchange information to allow the new virtual machine to rapidly assume control of a storage controller. Features and aspects hereof attempt to minimize (reduce) the amount of time during which no I/O requests are processed. By reducing such time below a threshold time tolerated by all attached external devices (host systems, storage devices, and/or other VMs in the storage controller), the fact that I/Os are not processed for a short period of time is transparent as viewed by such external devices. In firmware reprogramming techniques as presently practiced, it is possible (even typical) for the time period of unresponsiveness to trigger timeouts at the host systems (e.g., within their driver modules). The goal of the enhanced features and aspects hereof is to minimize the time period, so that, from the perspective of attached host systems (and their driver modules), there is no period of unresponsiveness. Or if there is a short period of unresponsiveness, I/O retries are successful and devices are not failed by the host. In accordance with the enhanced features and aspects hereof, a host system multi-path driver will not start switching paths to the device due to the shortened period of unresponsiveness. However, if a multi-path driver does perform a single switch to an alternate path, the original path would be rapidly restored.

Figure 4:
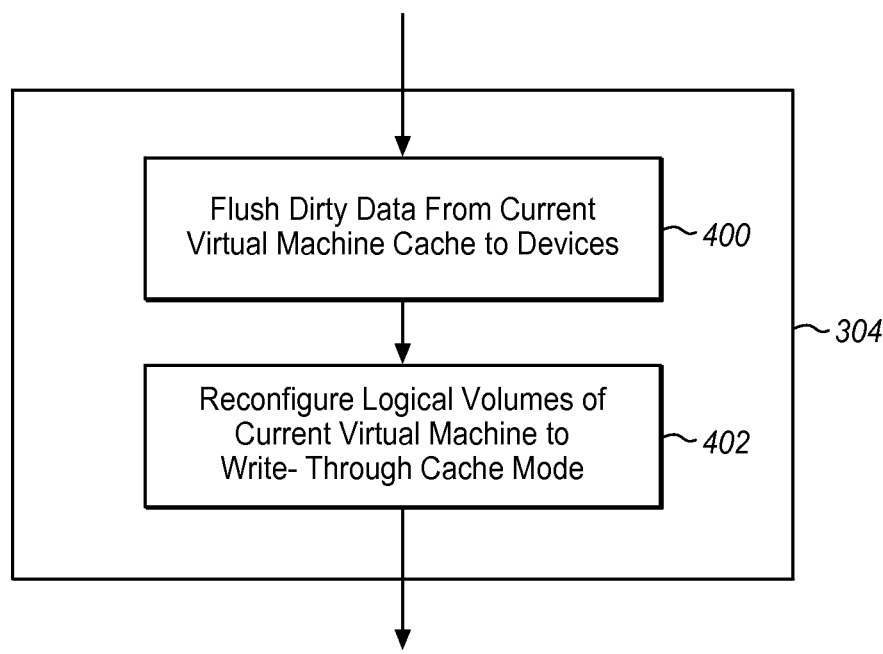

FIG. 4 is a flowchart describing exemplary additional details of the processing of step 304 of FIG. 3 to quiesce processing of requests by the current firmware operating in the current virtual machine. As well known to those of ordinary skill in the art, storage controllers typically utilize cache memory to speed processing of I/O requests. In the "write-back" mode of operation, significant volumes of data may be stored in cache and not yet posted or flushed to appropriate physical storage locations for persistent storage managed by the current firmware on the storage controller. By contrast, in the "write-through" mode of operation, cache memory is typically bypassed such that all data to be written to the storage system is immediately posted to corresponding physical locations of storage devices a storage system. At step 400, the current firmware operating in the current virtual machine will flush all dirty data from storage related cache memory utilized by the current virtual machine. The flushed dirty data is then posted on persistent storage devices associated with the storage system. At step 402, logical volumes presently under control of the current virtual machine may be reconfigured to a write-through cache mode of operation. By reconfiguring all logical volumes presently under control of the current virtual machine to the write-through cache mode, the new firmware may be assured that all data known to the current virtual machine and intended to be persistently stored has been flushed and that no new cache data will be generated by operation of the current firmware. In an alternative embodiment, the new firmware may map the portions of logical memory in the memory space of the current virtual machine utilized for caching of data so that the new firmware may directly access all presently cached data. In such an embodiment, cached data need not be flushed from cache memory in the current virtual machine but rather may simply be utilized as cached data by the new firmware operating in the new virtual machine. These and other design choices will be readily apparent to those of ordinary skill in the art.

Figure 5:
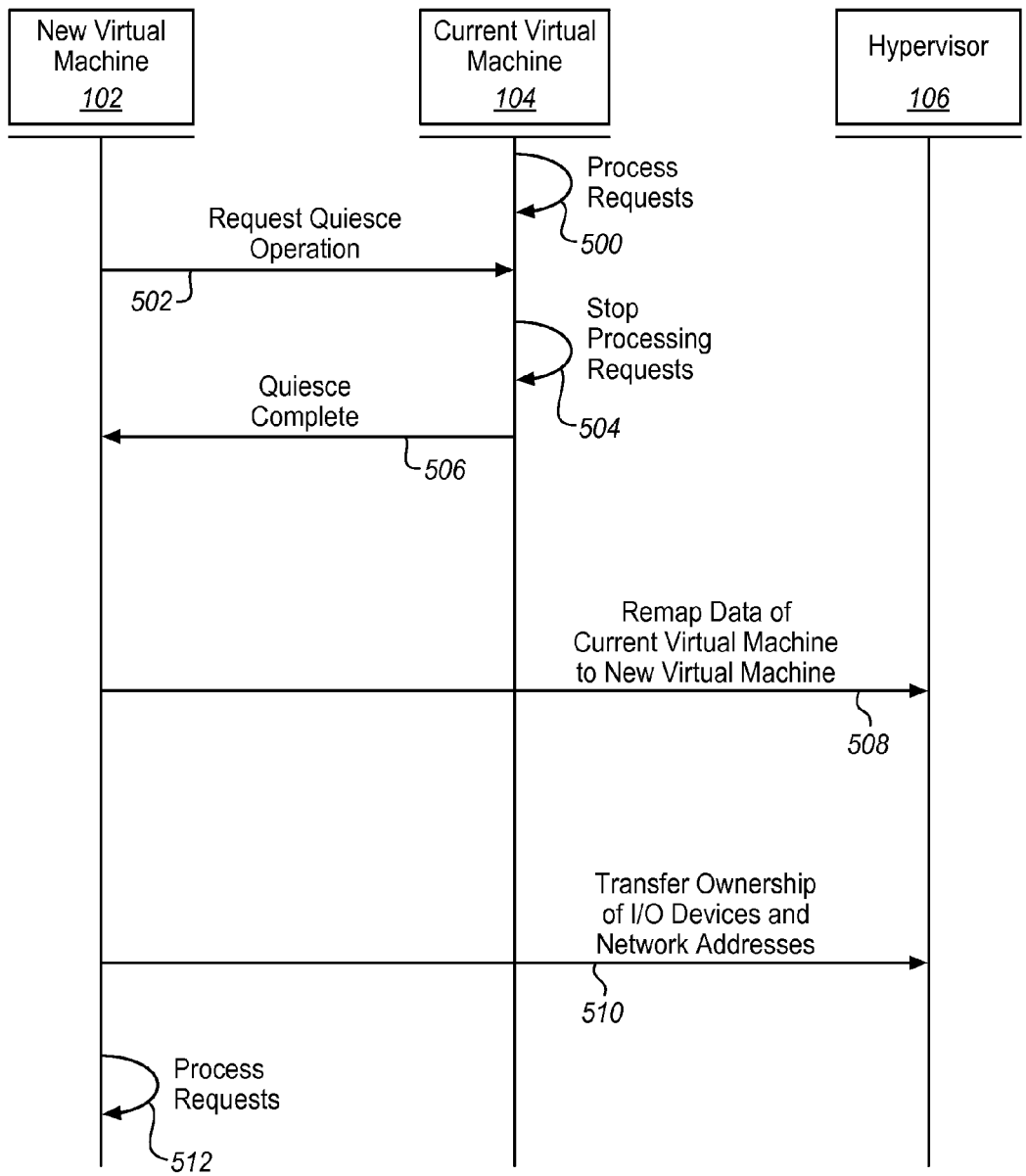
FIG. 5 is a diagram of exemplary processing and message exchanges for improved firmware reprogramming in a storage controller in accordance with features and aspects hereof.

FIG. 5 is a diagram indicating exemplary processing and exemplary exchange of messages to perform the firmware reprogramming described above in accordance with features and aspects hereof. Three vertical lines in FIG. 5 represent processing by each of the three indicated elements (namely, new virtual machine 102, current virtual machine 104, and hypervisor 106). Arrows among these various vertical lines indicate particular processing or messages exchanged as time progresses from the top of FIG. 5 toward the bottom of FIG. 5. Arrow 500 indicates that current virtual machine 104 is presently active processing requests. Arrow 502 represents a message directed from new virtual machine 102 to current virtual machine 104 (e.g., via a coupling driver within the hypervisor) requesting that the current virtual machine 104 quiesce present operations. Arrow 504 indicates processing within current virtual machine 104 to quiesce processing of received requests in response to the message from new virtual machine 102. As indicated above, quiescing of processing may include flushing any cached data as well as reconfiguring operation to avoid future use of cache memory. Requests currently being processed by current virtual machine 104 may be processed to completion. Queued requests that have not yet been processed may be processed to completion or may be left queued and pending for later processing by the new firmware. Upon completion of the quiescing of processing by current virtual machine 104, current virtual machine 104 signals its completion of quiescing as indicated by arrow 506 (e.g., by transmission of a message through a coupling driver of the hypervisor to new virtual machine 102). Knowing that current virtual machine 104 has quiesced its processing, new virtual machine 102 requests from hypervisor 106, as indicated by arrow 508, that the hypervisor map portions of data within the memory space of the current virtual machine into the memory space of the new virtual machine. As noted above, the data so mapped may relate to logical volumes and/or higher level storage application services provided and managed by current virtual machine 104. Arrow 510 then indicates a message from new virtual machine 102 to hypervisor 106 requesting transfer of ownership of I/O interfaces/devices and network addresses utilized by current virtual machine 104. The I/O interfaces/devices and network addresses are then transferred to control of new virtual machine 102. Having completed the transfer of I/O interfaces/devices and network addresses, and having mapped data from the memory space of the current virtual machine to the memory space of the new virtual machine, arrow 512 then represents commencement of processing of requests by the new firmware operating in the new virtual machine 102.

Those of ordinary skill in the art will readily recognize numerous additional and equivalent steps in the method of FIGS. 3 and 4 and additional and equivalent messages or processing in the diagram of FIG. 5. Such additional and equivalent elements are omitted herein for simplicity and brevity of this discussion While the invention has been illustrated and described in the drawings and foregoing description, such illustration and description is to be considered as exemplary and not restrictive in character. One embodiment of the invention and minor variants thereof have been shown and described. In particular, features shown and described as exemplary software embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for reprogramming firmware in a physical storage controller, the physical storage controller comprising a plurality of virtual machines operating under control of a hypervisor, the method comprising:

operating current firmware on a current virtual machine of the plurality of virtual machines to control the physical storage controller, wherein the current firmware processes I/O requests that are directed to the current virtual machine and that correspond with at least one storage device controlled by the current virtual machine;

starting a new virtual machine of the plurality of virtual machines, while the current virtual machine is operating, to assume control of the physical storage controller, wherein the new virtual machine is adapted to operate under control of new firmware that has been updated from the current firmware, and wherein the current virtual machine and the new virtual machine reside on the physical storage controller;

mapping data from a memory space of the current virtual machine into a memory space of the new virtual machine;

quiescing operation of the current firmware;

transferring control of the at least one storage device presently controlled by the current virtual machine to control by the new virtual machine; and operating the new firmware in the new virtual machine to control the physical storage controller and process I/O requests that are directed to the new virtual machine and correspond with the at least one storage device, wherein the hypervisor provides primitive mechanisms for inter-virtual machine communications, and wherein the current virtual machine and the new virtual machine implement a coupling driver that adapts the primitive mechanisms to a storage device driver framework supported by the plurality of virtual machines.

2. The method of claim 1
wherein the step of quiescing further comprises:
reconfiguring logical volumes presently controlled by the current virtual machine to operate in a write-through mode; and
flushing dirty data in a cache memory of the current virtual machine onto storage devices controlled by the physical storage controller.

3. The method of claim 1 further comprising:
transferring ownership of network addresses presently owned by the current virtual machine to ownership by the new virtual machine.

4. The method of claim 1
wherein the step of transferring further comprises:
synchronizing information in the mapped data with present status of the devices coupled with the new virtual machine.

5. The method of claim 1, wherein:
the steps of transferring and operating are performed without triggering a timeout at a host system that has sent an Input/Output request to the physical storage controller.

6. A method for reprogramming firmware in a physical storage controller, the physical storage controller comprising a plurality of virtual machines operating under control of a hypervisor, the physical storage controller further comprising current firmware presently operating in a current virtual machine of the plurality of virtual machines and new firmware loaded in a new virtual machine of the plurality of virtual machines, wherein the current firmware controls the physical storage controller, and wherein the current firmware processes I/O requests that are directed to the current virtual machine and that correspond with at least one storage device controlled by the current virtual machine, the method comprising:
starting operation of the new virtual machine, while the current virtual machine is operating, to assume control of the physical storage controller, wherein the new firmware in the new virtual machine initializes its operation and the new firmware has been updated from the current firmware, and wherein the current virtual machine and the new virtual machine reside on the physical storage controller;
mapping data from memory space of the current virtual machine into memory space of the new virtual machine;
directing the current virtual machine to enter a stable state in which no further processing is performed by the current virtual machine to process I/O requests
detecting that the current virtual machine has entered the stable state; and
responsive to detecting that the current virtual machine has entered the stable state, performing the additional steps of:
transferring control of the at least one storage device presently controlled by the current virtual machine to control by the new virtual machine;
transferring control of network addresses presently owned by the current virtual machine to ownership by the new virtual machine; and
operating the new firmware in the new virtual machine to control the physical storage controller and process I/O requests that are directed to the new virtual machine and correspond with the at least one storage device, wherein the hypervisor provides primitive mechanisms for inter-virtual machine communications, and wherein the current virtual machine and the new virtual machine implement a coupling driver that adapts the primitive mechanisms to a storage device driver framework supported by the plurality of virtual machines.

7. The method of claim 6 further comprising:
responsive to directing the current virtual machine to enter the stable state, performing the additional steps of:
reconfiguring, by operation of the current firmware, logical volumes presently under control of the current virtual machine to operate in a write-through mode with respect to use of a cache memory of the current virtual machine; and
flushing, by operation of the current firmware, dirty data in a cache memory of the current virtual machine onto storage devices controlled by the physical storage controller.

8. The method of claim 6 further comprising:
responsive to directing the current virtual machine to enter the stable state, performing the additional step of:
rejecting new management requests received over a management network device presently controlled by the current virtual machine.

9. The method of claim 6 further comprising:
responsive to directing the current virtual machine to enter the stable state, performing the additional step of:
informing, by operation of the current firmware, the new virtual machine of network addresses presently owned by the current virtual machine.

10. The method of claim 6
the data mapped from the memory space of the current virtual machine describes logical volumes controlled by the current virtual machine, and includes status information for the at least one storage device controlled by the current virtual machine.

11. The method of claim 6, wherein:
the steps of transferring and the step of operating are performed without triggering a timeout at a host system that has sent an Input/Output request to the physical storage controller.

12. A physical storage controller comprising:
a hypervisor operable to create and manage a plurality of virtual machines on the physical storage controller;
a current virtual machine operable under control of the hypervisor wherein current firmware is operable on the current virtual machine to control the physical storage controller, and to process received I/O requests that correspond with at least one storage device controlled by the current virtual machine; and
a new virtual machine operable under control of the hypervisor wherein new firmware is loaded into the new virtual machine, wherein the new firmware is adapted to assume control of the physical storage controller and to process I/O requests, wherein the current virtual machine and the new virtual machine reside on the physical storage controller, and wherein the new firmware has been updated from the current firmware,
wherein the physical storage controller is adapted to quiesce operation of the current firmware;
wherein the physical storage controller is further adapted to map data in a memory space of the current virtual machine into a memory space of the new virtual machine,
wherein the physical storage controller is further adapted to transfer control of the at least one storage device presently controlled by the current virtual machine to control by the new virtual machine, and wherein the physical storage controller is further adapted to operate the new firmware in the new virtual machine to control the physical storage controller and to process I/O requests that are directed to the new virtual machine and that correspond with the at least one storage device, wherein the hypervisor provides primitive mechanisms for inter-virtual machine communications, and wherein the current virtual machine and the new virtual machine implement a coupling driver that adapts the primitive mechanisms to a storage device driver framework supported by the plurality of virtual machines.

13. The controller of claim 12 wherein the controller is further adapted to quiesce by reconfiguring logical volumes presently controlled by the current virtual machine to operate in a write-through cache mode and flushing dirty data in a cache memory of the current virtual machine onto storage devices coupled with the controller.

14. The controller of claim 12 wherein the controller is further adapted to transfer ownership of network addresses presently owned by the current virtual machine to ownership by the new virtual machine.

15. The controller of claim 12 wherein the controller is further adapted to transfer devices by synchronizing information in the mapped data with present status of the devices coupled to the new virtual machine.

16. The storage controller of claim 12, wherein:

the physical storage controller is further adapted to transfer control of devices and operate the new firmware without triggering a timeout at a host system that has sent an Input/Output request to the physical storage controller.

* * * * *